Feb. 11, 1969 H. ZIMMERMANN 3,427,032

HOLDING DEVICE FOR THE PICKUP IN A TONE ARM

Filed Jan. 10, 1966

*INVENTOR.*

HEINRICH ZIMMERMANN

*BY*

Attorney 3,427,032
HOLDING DEVICE FOR THE PICKUP IN A TONE ARM

Heinrich Zimmermann, St. Georgen, Black Forest, Germany, assignor to Dual Gebrueder Steidinger, St. Georgen, Black Forest, Germany Filed Jan. 10, 1966, Ser. No. 519,631
Claims priority, application Germany, Jan. 9, 1965, St 23,187, Patent 1,231,450
U.S. Cl. 274—24 5 Claims
Int. Cl. G11b 3/02

ABSTRACT OF THE DISCLOSURE

The pickup of a phonograph is attached permanently to a pickup carrier. The pickup carrier is engageable with a mating element in a pick-up arm. When in engagement, a handle on a plate of the pickup arm is pivoted until its cam moves into wedged engagement with an inclined plane on the pickup carrier, whence the pickup carrier becomes locked in fixed position relative to the pickup arm.

The present invention relates to a holding device for the pickup in a tone arm by means of a member carrying the pickup which is exchangeably secured in the pickup arm.

The primary object of the present invention is to provide a carrying member for the pickup which can be easily replaced on the pickup arm and may be locked against shocks during transportation, and which is adapted to be connected or attached to the pickup arm as rigidly as possible, and which is light.

It is a further object of the present invention to provide a locking mechanism which is simple in operation and manufacture thereof, while utilizing elements which are necessary anyway.

It is yet another object of the present invention to easily and conveniently accommodate and make accessible several plugs and to provide an arrangement for simple manufacture thereof.

It is yet another object of the present invention to use the pickup arm handle as actuating element for locking to allow for sturdy and easily accomplished locking.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
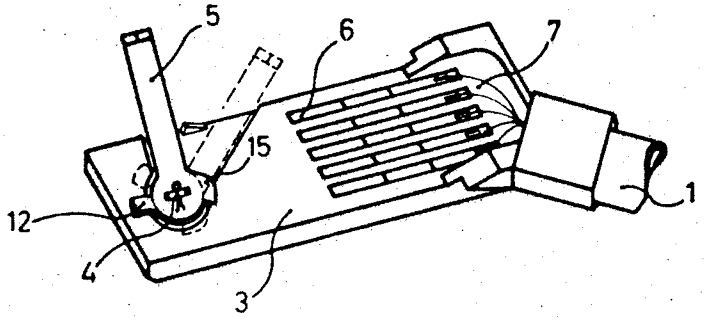
FIG. 1 is a bottom view in perspective of a pickup arm head.

One embodiment of the present invention is described hereinafter for purposes of making an operative disclosure.

The pickup arm 1 is provided in the front part thereof with a recess 2 and in the forward direction in the form of a plate 3. A handle 5 is rotatably mounted about a pivot 4 to the plate 3. Additionally, a plurality of contact pieces 6 in operative connection with the current feeder lines 7 are mounted at the bottom side or surface of the plate 3. The member 9 carrying the pickup 8 is so developed and arranged that it completes, in regard to the configuration thereof, the pickup arm head. On the upper side thereof it includes five flatly positioned leaf-type springs 10 which are in operative engagement with the pickup 8 and with the screening protection thereof, respectively.

Figure 2:
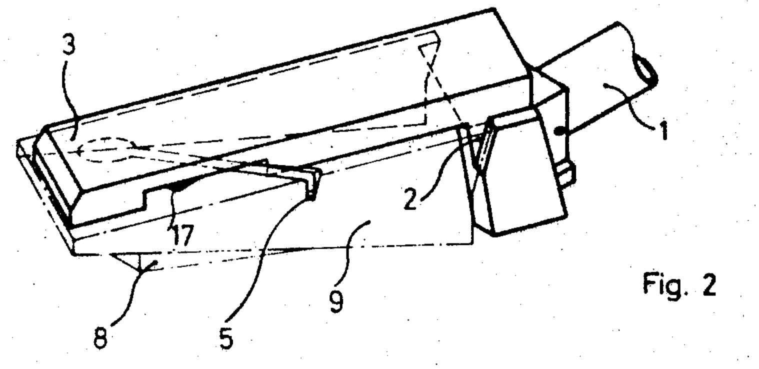
FIG. 2 is a top plan view in perspective of the pickup arm head of FIG. 1.
Figure 3:
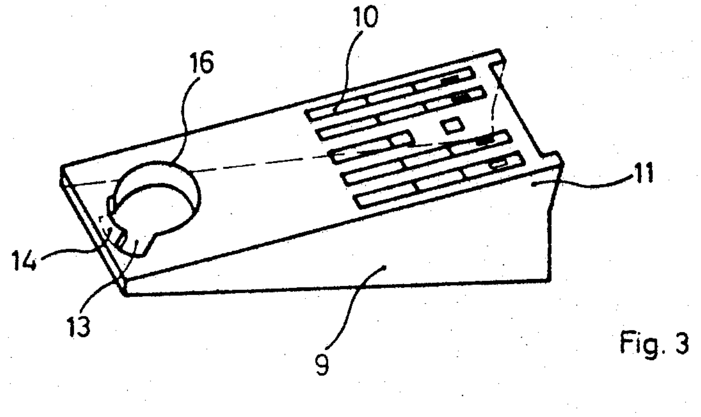
FIG. 3 is a view in perspective of the exchangeable part of the pickup arm head carrying the pickup.

For the operation of the pickup, the handle 5 is brought into the position shown in broken lines and the member 9 carrying the pickup 8 is pressed with the rear part 11 thereof into the recess 2 and upwardly against the plate 3 of the pickup 1. A locking cam 12 is provided on the handle 5 in proximity to the pivot 4 and extends into an aperture 13 of the member 9 carrying the pickup. During this upward pressing or pushing action, the leaf-type springs 10 come into contact with the contact pieces 6 and the locking cam. Upon turning or shifting the handle 5 into the position as shown, the locking cam 12 runs up onto an inclined or sloping plane 14, thus clamping the member 9 carrying the pickup against the plate 3. At the same time, a lug portion 15 disposed on the handle 5 opposite the locking cam 12 pushes the member 9 carrying the pickup 8 in the direction toward the pickup arm 1 by gliding along an eccentrically extending section 16 of the aperture 13, so that this member is clamped against the pickup arm. For the purpose of securing the handle 5 in position against an undesirable pivoting or torsion in the sense of an unlocking or a releasing action a locking cam 17, shown in FIG. 2, is mounted to plate 3. Prior to turning or pivoting the handle 5 for the purpose of exchanging the member 9 carrying the pickup 8, the handle 5 is pressed downwardly to such an extent that it is adapted to pass by the locking cam 17 without hindrance.

The invention further comprises means to position the lever 5 rotatably about an axis arranged perpendicularly to the plane of the plate member 3. The lever projects with its free end beyond the plate for manual handling. The lever-locking means 12 between the plate and the lever, lock the lever in one end-position of the range of adjustment thereof. Electric connectors are provided in the interior of the plate and connect them with current circuitry of the pickup arm. Fastening means are provided for attaching the pickup to the carrier member 9 and electric circuitry members connect the pickup with the carrier member. The electric connecting circuitry on the carrier member also connects with the respective parts of the device cited above and particularly engage with the circuitry of the plate, when the carrier member is attached to the plate, with the recesses adjacent the pickup arm end of the plate, with the corresponding projections at the rear end of the carrier member for mutual engagement by the insertion or attachment of the carrier member below the plate in the direction toward the pickup arm. The locking means are mounted at the lever and at the corresponding point of the carrier member in such a manner that the plate and the carrier member may be joined together when the lever is in its non-locking position. When however the lever is brought into locking position the plate and the carrier member are locked together.

For this purpose a first lug portion is provided on the lever, which when in a released unlocked position of the lever during the attachment of the carrier member to the plate is placed ahead of the inclined plane at the carrier member. When the lever is brought into locking position the first lug portion abuts against the said inclined plane, thus clamping the carrier member and the plate together in a direction perpendicular to the plate.

A second lug portion is provided on the lever, a cylindrical recess in the carrier member is positioned eccentrically to the pivotal axis of the lever. Wedge shaped recesses near the pick up arm end of the plate receive the corresponding projections of the carrier member. The second lug portion is positioned opposite the cylindrical wall of the recess when the carrier member is attached to the plate and while the lever is pivoted into its locking position, means are provided to press the carrier member into the wedge shaped recesses near the pick-up arm end of the plate by the second lug portion which abuts against the cylindrical wall of the recess.

The leaf-type spring-shaped contact springs in the plane on the upper side of the carrier member are arranged in such a manner that they come into operative engagement the corresponding contacts of the plate, when the carrier member is clamped to the plate.

Thus, the present invention is an improvement over the prior art in which the carrying member is provided as continuation of the pickup arm in the form of a head and adapted to be attached to the remainder of the pickup arm, which constructions have been found unsatisfactory for the quality of sound reproduction or playback since a sufficiently firm, secure and exactly defined setting or positioning cannot be achieved therewith. Furthermore, such arrangements of the prior art due to the smallness of the pickup arm neck, make it difficult to accommodate several electric plugs, which number up to five in the now customary stereo pickups.

The present invention is also an improvement over the prior art devices providing for the carrying members sliding means from the front into the pickup arm head by means of guide bars and may be coupled with a lock by means of a cam. The guide bars require a complicated shaping tool for the pickup and markedly reduce the surface available for accommodating the current collector or feeder contacts, which is of essential significance for the accommodation of several contacts in the form of flat or leaf-type springs best suitable for a convenient assembly. Moreover, the guide bars including the pickup arm head of the prior art represent an undesirable accumulation of material because of the lateral walls.

It should be understood of course that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

I claim:

1. A holder comprising a pickup arm (1) having a plate (3), a pickup carrier (9) having a rearward extension (11), a pickup (8) carried by said pickup carrier, a recess (2) in said pickup arm, said pickup carrier sitting on the plate (3) with its extension (11) mating with said recess (2), a handle (5) pivotally mounted to said plate, a locking cam (12) forming part of said handle, an inclined plane (14) on the pickup carrier (9), said cam (12) in wedged engagement with said inclined plane, the wedged engagement fixing the position of the pickup carrier on the plate, whereby the mating of extension (11) with recess (2) is maintained and said pickup carrier is held fixed to said plate and said pickup arm.

2. A holder as in claim 1, said pickup carrier (9) carrying on its top a plurality of aligned leaf springs (10), said plate (3) carrying a plurality of aligned contacts (6), said leaf spring and said contacts arranged for mating contact as circuit members, when carrier (9) is attached to the plate (3).

3. A holder as in claim 1, said handle (5) projecting from its pivot beyond said plate for manual actuation; the pivoting of handle (5) being over a predetermined angular range, the wedged engagement of said cam (12) with said inclined plane occurring in one end position of the range of pivoting of said handle, electric connecting means of said pickup arm, and circuitry on the carrier (9) connecting with the electric connecting means on the plate when the carrier (9) is attached to the plate, said circuitry on the carrier (9) including the pickup (8).

4. A holder as in claim 3, further comprising a lug portion (15) plus eccentrically extending section (16) means on said handle and said pickup carrier to bias extension (11) and recess (2) in mating relationship as and aftre the handle (5) is pivoted into said one end position.

5. A holder as in claim 3, further comprising a locking cam (17) means to lock handle (5) releasably in said one end position.

References Cited

UNITED STATES PATENTS

| | | | |
|---|---|---|---|
| 2,453,894 | 11/1948 | Chorpening | 274—24 |
| 3,176,993 | 4/1965 | Jensen | 274—24 |

HARRY N. HAROIAN, *Primary Examiner.*

U.S. Cl. X.R.

274—37, 25